United States Patent
Saigo et al.

(10) Patent No.: US 6,214,277 B1
(45) Date of Patent: Apr. 10, 2001

(54) METHOD FOR PRODUCING PLASTIC COMPOSITE MOLDED PARTS

(75) Inventors: Takamitsu Saigo; Tsukasa Akaishi; Yutaka Ueji; Masaya Kurokawa, all of Osaka (JP)

(73) Assignee: Starlite Co., Ltd., Osaka (JP)

(*) Notice: Subject to any disclaimer, the term of this patent is extended or adjusted under 35 U.S.C. 154(b) by 0 days.

(21) Appl. No.: 09/231,816

(22) Filed: Jan. 15, 1999

(30) Foreign Application Priority Data

| Jan. 19, 1998 | (JP) | 10-007774 |
| Mar. 25, 1998 | (JP) | 10-077962 |
| Mar. 25, 1998 | (JP) | 10-077963 |
| Mar. 25, 1998 | (JP) | 10-077964 |

(51) Int. Cl.$^7$ .................................................. B29C 45/26
(52) U.S. Cl. .................... 264/443; 264/478; 264/328.16; 264/328.19
(58) Field of Search ........................ 264/443, 69, 40.1, 264/40.6, 71, 328.1, 328.16, 328.17, 331.19, 478

(56) References Cited

U.S. PATENT DOCUMENTS

| 3,953,394 | * | 4/1976 | Fox et al. . |
| 4,469,649 | * | 9/1984 | Ibar ................................ 264/319 |
| 4,695,602 | * | 9/1987 | Crosby et al. . |
| 5,098,940 | * | 3/1992 | Brooks . |
| 5,254,298 | * | 10/1993 | Ibar ................................ 264/69 |
| 5,306,772 | * | 4/1994 | Mimura et al. . |
| 5,556,895 | * | 9/1996 | Lipinsky . |
| 5,705,201 | * | 1/1998 | Ibar ................................ 264/69 |
| 5,885,495 | * | 3/1999 | Ibar ................................ 264/69 |
| 6,025,458 | * | 2/2000 | Lipinsky et al. . |

* cited by examiner

Primary Examiner—Jill L. Heitbrink
(74) Attorney, Agent, or Firm—Armstrong, Westerman, Hattori, McLeland, & Naughton, LLP (57) ABSTRACT

Plastic composite gears and bearings with excellent friction and wear properties and further, plastic composite molded parts with excellent dimensional accuracy, can be presented at a low cost without adding large quantities of solid lubricant and glass fibers, etc., by adding a crystalline nucleus to crystalline polymers, such as polyacetal, polyamide, polyphenylene sulfide, etc., molding while applying vibrational energy, heat-treating the molded part after molding at a temperature that is the glass transition point of the crystalline polymer or higher and the melting point of the crystalline polymer or lower, heat treating the molded part after molding in the presence of a natural mineral, or by irradiating the molded part after molding with far infrared rays or infrared rays in order to reduce spherulite size of the crystalline polymer in the molded part and increase the degree of polymerization and thereby control crystal morphology and reduce the coefficient of friction and specific wear rate, and the molded parts have excellent recyclability.

27 Claims, 4 Drawing Sheets

G ; PIN GATE

FIG. 1

G ; PIN GATE

METHOD FOR PRODUCING PLASTIC COMPOSITE MOLDED PARTS

BACKGROUND OF THE INVENTION

1. Field of the Invention

The present invention relates to a method for producing various types of plastic composite molded parts, such as the plastic composite gears, bearings and sliding parts of business machines, automobiles, and industrial equipment in general, and further, in OA equipment, etc., having many areas of strict dimensional accuracy, that is, strict dimensional tolerance.

2. Description of the Related Art

The properties required of plastic composite gears are gear properties, including friction and wear properties, gear fatigue strength, etc., under the conditions of use (ambient temperature, lubrication method, life, flame resistance), gear accuracy and cost, etc. Moreover, the properties required of plastic composite bearings are friction and wear properties and dimensional accuracy that can withstand severe sliding conditions under the conditions of use (ambient temperature, lubrication method, life, flame resistance) and cost, etc. A gear or bearing whose coefficient of friction and specific wear rate have been reduced by molding a plastic composite, which is various solid lubricants, such as polytetrafluoroethylene, molybdenum disulfide, graphite, etc., added to a crystalline polymer, such as polyacetal, polyamide, polyphenylene sulfide, etc., to provide friction and wear properties, has been used as this type of plastic composite gear and bearing. However, there is a reduction in mechanical properties of the molded part when the above mentioned solid lubricant is added to the crystalline polymer. Therefore, in the case of molded parts that require high fatigue strength, such as gears and bearings, a composite material is made of various reinforcing fibers, such as glass fibers, carbon fibers or aramide fibers, etc. further added to the above mentioned plastic composite composition as the matrix. Nevertheless, if this type of composite material is used, not only is material cost increased, but there is also an increase in viscosity of the plastic composite during molding, with fluidity becoming poor, and therefore, injection pressure during filling process must be set at a high pressure and as a result, facility costs and production costs for molding will rise. Moreover, there is a chance that residual stress of the molded part will increase. Furthermore, anisotropy develops due to orientation of the fibers during molding in molded parts that are obtained by molding a plastic composite to which reinforcing fibers have been added and it becomes very difficult to control shape and mold parts with high accuracy. Moreover, shape accuracy decreases. In addition, mechanical properties, particularly toughness, of plastic composite to which large quantities of solid lubricant have been added decreases, even if reinforcing fibers are added, and therefore, there is also a problem in that they cannot be used in gears and bearings where fatigue strength is required. In addition, there is a problem in terms of recyclability with plastic composite molded parts to which have been added several types of raw materials, particularly reinforcing fibers such as glass fibers, etc.

Moreover, crystalline polymers generally have better mechanical strength, such as flexural modulus, etc., when compared to amorphous polymers. However, the spherulite size of the crystalline polymer and degree of crystallization vary considerably at the surface layer and the inside of a molded part obtained by conventional injection molding of crystalline polymers because of the cooling speed gradient in the molded part. Put briefly, in contrast to the fact that spherulite size of the crystalline polymer is small and the degree of crystallization is small at the surface layer of the molded part, which is close to the mold surface, because it is rapidly cooled after injection molding, contrary to the above mentioned surface layer, spherulite size is large and the degree of crystallization is high inside the molded part, which is away from the mold surface, because it is gradually cooled. Thus, local differences in the spherulite size and the degree of crystallization within one molded part will result in differences in mold shrinkage at each area of the molded part. This means that when a product having many areas with strict dimensional accuracy (strict dimensional tolerance), such as OA equipment products, etc., are molded with a mold that has been made at a certain shrinkage factor estimate, it will be extremely difficult to keep the dimensions of each area of the molded part at dimensional tolerance. Consequently, in the past it has been difficult to mold products with many areas of strict dimensional accuracy (strict dimensional tolerance) using crystalline polymers. Therefore, amorphous polymers rather than crystalline polymers are generally used for plastic composite molded parts with strict dimensional accuracy. However, there is a tendency toward insufficient flexural modulus as the molded part becomes thinner when amorphous polymers are used. Consequently, composite materials that use a reinforcing fiber system such as glass fibers are being considered to improve the flexural modulus of molded parts molded from these amorphous polymers. Nevertheless, as in the case of the above mentioned crystalline polymer, there are problems in that facility costs and product costs rise and residual stress on the molded part increases due to high material cost and an increase in viscosity and deterioration of fluidity of the plastic composite during molding, and there is a problem in that there is a reduction in dimensional accuracy due to anisotropy that is the result of fiber orientation during molding, in the case of such composite materials that use reinforcing fiber systems.

In this manner, the above mentioned type of composite materials, where various types of reinforcing fibers, such as glass fibers, carbon fibers, aramide fibers, etc., are added to crystalline polymers, have been used in the past to improve gear properties and the friction and wear properties required of bearings. However, it is difficult to obtain high-accuracy gears and bearings due to orientation of the fibers during injection molding with this type of fiber composite. Therefore, in light of the above mentioned points, the present invention presents a method for producing plastic composite gears that have excellent gear properties, such as excellent friction and wear properties, gear fatigue strength, etc., and therefore have gear accuracy, as well as plastic composite bearings with excellent shape accuracy and excellent friction and wear properties. Furthermore, a variety of friction and wear properties are required of plastic composite molded parts used in sliding parts, such as the above mentioned gears and bearings, etc., depending on various conditions, such as use conditions (temperature, life, flame resistance), cost, etc., and it is necessary to balance these properties with cost performance. Therefore, a method of producing plastic composite molded parts of improved friction and wear properties and excellent recyclability at a low cost without adding large amounts of various types of solid lubricants and glass fibers, etc., as in the past is presented by the present invention as plastic composite molded parts used in sliding parts that require excellent friction and wear properties.

Furthermore, as previously mentioned, it has been very difficult to obtain plastic composite molded parts that can satisfy both mechanical strength, such as flexural modulus, etc., and high dimensional accuracy in the past. Therefore, a method for producing plastic composite molded parts that are molded parts of crystalline polymers with excellent mechanical strength, such as flexural modulus, etc., and that have such excellent dimensional accuracy that they can even be used for products with many areas of strict dimensional accuracy, that is, strict dimensional tolerance, is presented by the present invention.

SUMMARY OF THE INVENTION

The present invention is a method for producing plastic composite molded parts, which is characterized in that it is a method for producing molded parts by injection molding or transfer molding of crystalline polymers and in that crystal morphology of the crystalline polymer is controlled during molding or after molding.

The above mentioned controlling crystal morphology of the crystalline polymer means that crystal morphology of the polymer during molding is made almost uniform over the entire molded part, the spherulite size of the polymer in the molded part is made almost uniform throughout the entire molded part, the degree of crystallization of the polymer in the molded part is made almost uniform throughout the entire molded part, the spherulite size of the polymer in the molded part is reduced in comparison to that prior to molding, the degree of crystallization of the polymer in the molded part is increased in comparison to that prior to molding, etc.

It is possible to reduce the coefficient of friction of the molded part and reduce the specific wear rate of the molded part and thereby improve dimensional accuracy and shape of the molded part, by controlling the crystal morphology as previously described.

The method wherein a crystalline material is added to the crystalline polymer and molded, the method wherein molding is performed while applying vibrational energy, the method wherein a crystalline nucleus is added to the crystalline polymer and molding is performed while vibrational energy is being applied, the method wherein the molded part after molding is heat treated at a temperature that is the glass transition point of the crystalline polymer or higher and the melting point of the crystalline polymer or lower, the method wherein the molded part after molding is heat treated in the presence of a natural mineral, the method wherein the molded part after molding is irradiated with far infrared rays, or infrared rays, etc., are methods of controlling the crystal morphology of the polymer in the molded part as previously described.

There are no special restrictions to the crystalline polymer that is used in the production method of the present invention, but polyacetal, polyamide, and polyphenylene sulfide are given as preferred polymers.

If the crystalline polymer is polyacetal, the spherulite size of the polymer in the molded part is preferably 20 μm or smaller and the degree of crystallization is preferably 50% or higher. In this way it is possible to produce a good polyacetal bearing. It is further preferred that the spherulite size of the above mentioned polymer be 15 μm or smaller and when this is the case, it is possible to produce polyacetal molded parts with excellent dimensional accuracy and good polyacetal gears.

Moreover, if the crystalline polymer is polyamide, the spherulite size of the polymer in the molded part is preferably submicron and the degree of crystallization is preferably 20% or higher. As a result, it is possible to produce good polyamide gears and bearings.

Furthermore, when the crystalline polymer is polyphenylene sulfide, the spherulite size of the polymer in the molded part is preferably submicron and the degree of crystallization is preferably 30t or higher, with a degree of crystallization of 50% or higher being preferred even further. When this is the case, good polyphenylene sulfide gears and bearings can be produced.

DESCRIPTION OF THE PREFERRED EMBODIMENTS

The plastic composite used to mold the plastic composite gears related to the present invention is a crystalline polymer, such as polyacetal, polyamide, polyphenylene sulfide, etc. When the molded part is one that requires dimensional accuracy, various solid lubricants, such as polytetrafluoroethylene, molybdenum disulfide, graphite, etc., reinforcing plastics, such as glass fibers, carbon fibers, or aramide fibers, etc., and other additives can be added to these crystalline polymers, preferably polyacetal, as needed as long as the purpose of the present invention is not lost.

By means of the present invention, the crystal morphology of the entire molded part, which is molded from a crystalline polymer as previously described, is kept uniform. The above mentioned crystal morphology represents the overall size of the spherulites of the crystalline polymer, the number of spherulites, and the degree of crystallization. This crystal morphology is controlled by, for instance, producing many spherulites in the plastic composite molded part, which is molded from a crystalline polymer, and reducing and making uniform the spherulite size of the polymer. By doing this, it is possible to increase the degree of crystallization. By means of the present invention, this crystal morphology is made uniform throughout the entire molded part and the fluctuations in spherulite size and the degree of crystallization in one molded part are controlled and as a result, a plastic composite molded part that retains the mechanical strength of the crystalline polymer itself and that has excellent dimensional accuracy is obtained. In short, by reducing spherulite size of the crystalline polymer in the molded part, or by increasing the degree of crystallization, a plastic composite molded part with excellent dimensional stability is obtained because fluctuations in spherulite size and the degree of crystallization throughout the entire molded part are controlled without reducing mechanical properties of the molded parts. For example, by producing many spherulites and reducing spherulite size in plastic composite gears that are molded from crystalline polymers, or by increasing the degree of crystallization, fluctuations in the spherulite size and the degree of crystallization of one molded part are controlled and as a result, it is possible to make a gear with excellent gear properties and gear accuracy. Put briefly, by increasing the number of spherulites in the crystalline polymer of the molded gear and reducing spherulite size, or by increasing the degree of crystallization, it is possible to reduce frictional drag and reduce wear rate to as much as ¹⁄₁₀ to ¹⁄₁₀₀ what it generally is, without reducing mechanical properties of the gear, and produce a plastic composite gear, which simultaneously has excellent friction and wear properties and, because fluctuations in spherulite size and the degree of crystallization in one molded part are controlled, excellent gear properties. Moreover, for example, by producing many spherulites and reducing the spherulite size of the above mentioned crystalline polymer, or increasing the degree of crystallization in a plastic bearing molded from a crystalline polymer, and thereby controlling fluctuations in the spherulite size and degree of crystallization in one molded part, it is possible to produce a plastic composite molded part with excellent bearing properties and shape accuracy. Put briefly, it is possible to reduce frictional drag and reduce wear rate to as much as 1/10 to 1/100 what it generally is by increasing the number of spherulites and reducing the spherulite size of the crystalline polymer of a molded part, or by increasing the degree of crystallization, and as a result, a plastic composite bearing is made which simultaneously has excellent friction and wear properties and, by controlling fluctuations in spherulite size or the degree of crystallization in one molded part, excellent bearing properties.

Furthermore, as was previously mentioned, there were fluctuations in the spherulite size and the degree of crystallization within one molded part in that the spherulite size and the degree of crystallization of the crystalline polymer at the surface layer and inside a molded part were a small spherulite size and a low degree of crystallization at the surface layer of the molded part, which touches the mold, versus a large spherulite size and a high degree of crystallization inside the molded part and for this reason, mold shrinkage was different at different areas in the molded part and dimensional accuracy was poor with conventional injection molding of crystalline polymers. With respect to this point, crystal morphology is controlled by the present invention and crystal morphology, such as spherulite size, the degree of crystallization, etc., of the entire molded part is made uniform. Therefore, fluctuations in mold shrinkage of one molded part are controlled and a plastic composite molded part with excellent dimensional accuracy is obtained, as previously mentioned. There are also no problems with further warping.

Furthermore, the above mentioned crystal size was observed by an optical polarization microscope in the present invention, and the degree of crystallization is the value that was obtained by analysis by the Rurando method after X-ray diffraction determination.

Spherulite size of the crystalline polymer in the plastic composite molded parts related to the present invention is not generalized because it varies with the type of polymer, but it is controlled to as much as ⅕ to ¹⁄₁₀₀ the spherulite size of molded parts in general. Moreover, the degree of crystallization is controlled so that it is either the same or higher than that of molded parts in general. Thus, by controlling spherulite size so that it is smaller than that of molded parts in general and controlling the degree of crystallization so that it is either the same, or higher than, that of molded parts in general, the number of crystals in the crystal polymer is increased. For instance, if the crystalline polymer is polyacetal, it is preferred that the spherulite size of the molded part be 20 $\mu$m or less, and when the molded part is a gear or one that is hard and requires dimensional accuracy, it is preferred that spherulite size is 15 $\mu$m or smaller and the degree of crystallization is 50% or higher. Moreover, it is preferred that the spherulite size of the entire molded part be submicron and that the degree of crystallization be 20% or higher when the crystalline polymer is polyamide. Furthermore when the crystalline polymer is polyphenylene sulfide, spherulite size of the entire molded part is submicron and the degree of crystallization is 30% or higher, with 50% or higher being further preferred. By controlling spherulite size and the degree of crystallization of the entire molded part as previously described, dimensional stability is not simply improved, but instead, because spherulite size is reduced, it is possible to improve properties of impact strength, toughness, and friction and wear properties without losing the mechanical properties of the molded part, which are the properties of the crystalline polymer itself. Consequently, there is also no problem with an increase in cost due to the addition of large quantities of several types of solid lubricants as in the past. Furthermore, there are also no problems attributed to a reduction in fluidity of the plastic during molding due to addition of reinforcing fibers to fight the reduction in mechanical properties and orientation of fibers, and the molded part has excellent recyclability because the present invention dispenses with the use of reinforcing fibers, such as glass fibers, etc.

Conventional injection molding is not the only method of molding the plastic composite molded parts related to the present invention, and transfer molding, etc., can also be used. There are no particular restrictions, as long as the molding method is one wherein solidification proceeds once the plastic has gone through a molten state, but injection molding and transfer molding are preferred, and injection molding is particularly preferred.

The method wherein a crystalline nucleus is added and molded, the method wherein molding is performed while applying vibrational energy, and the method wherein addition of crystalline nucleus and application of vibrational energy are concomitantly used are methods of controlling crystal morphology of the polymer in the molded part. By means of these methods, it is possible to reduce spherulite size of the entire molded part and keep spherulite size uniform.

The above mentioned crystalline nucleus should be a substance that can produce many spherulites of the crystalline polymer and reduces spherulite size and also increases and makes uniform the degree of crystallization. Both organic and inorganic systems can be used. Silicon carbide (SiO), zinc oxide (ZnO), copper oxide (CuO), silicon dioxide ($SiO_2$), iron oxide (FeO), etc., are given as actual examples of inorganic crystalline nucleuses. Moreover, carboxylic acid metal salt compounds (for instance, the montan acid systems of Hostamont CaV and Hostamont NaV; both made by Hoechst) are given as actual examples of organic systems. The amount of crystalline nucleus added to the crystalline polymer varies with the type of polymer and crystalline nucleus used, the properties required of each molded part, such as the gear properties of friction and wear properties and gear fatigue strength, and gear accuracy in the case of gears, bearing properties, such as friction and wear properties, etc., in the case of bearings, mechanical strength and dimensional accuracy needed for the purpose for which the molded part will be used and the conditions under which it will be used, and shape properties, such as circularity, cylindricity, etc., but it is generally with a range of 0.001 to several ten wt %, preferably 0.01 to 10 wt %, per polymer. If less than 0.001 wt % of the crystalline nucleus is added, there are cases where it will be difficult to control crystal morphology of the crystalline polymer to within the desired range. Moreover, if too much crystalline nucleus is added, there will be a tendency toward the viscosity of the molten plastic increasing during molding, making molding difficult, and mechanical strength, such as gear properties and bearing properties, decreasing.

Molding while applying vibrational energy is another method of keeping spherulite size of the polymer in the molded part uniform. When a crystalline polymer, or a plastic composite of various solid lubricants, reinforcing fibers, and other additives added as needed to a crystalline polymer, is actually molded, mechanical vibrations of several Hz to several 1,000 Hz, preferably 10 to 5,000 Hz, are applied. If the number of vibrations is increased to several 10,000 Hz, not only will the mold and the injection molding machine be damaged, but there are also cases where spherulite size increases somewhat. Moreover, there are no special restrictions to the size of the vibrations, but they should be ±0.01 mm to ±1 mm. It is possible to produce many fine spherulites and to keep these spherulites from growing by applying this type of vibration. In this case, the vibrations can be applied from the beginning to the end of molding or the vibrations can be applied only after the polymer has been solidified from a molten state and released from the mold. The time when the vibrations are applied should be selected in accordance with the type of polymer used, the composition of the plastic composite as the raw molding material, and the properties required of the product based on the use of the molded part, the conditions under which it will be used, etc. Moreover, the vibrations can be applied continuously, or they can be applied intermittently by stopping the vibrations when the molded part is being released from the mold for each molding cycle, etc. The method wherein, for instance, a vibrating pin is placed in the mold and vibrations are applied to the plastic composite within the cavity during molding is given as basic means for applying vibrations. An ejector pin or a sleeve pin can be used, or another design can be used, for the above mentioned vibrating pin. Further, when molding is performed while applying vibrations to the plastic composite inside the cavity as previously described, there is also an advantage in that the formation of sink marks, warping, etc., of the molded part can be prevented to obtain a molded part of very high accuracy.

When polytetrafluoroethylene is added and molded while applying vibrational energy as another method of controlling crystal morphology, the amount of polytetrafluoroethylene added is preferably within a range of 5 to 25 wt % in the case of bearings and 1 to 10 wt % in the case of gears. If the amount of polytetrafluoroethylene added exceeds 25 wt %, there is a tendency toward the bearing properties of friction and wear resistance decreasing, while if it exceeds 10 wt %, there will be a tendency toward gear properties of friction and wear resistance and gear fatigue strength decreasing.

The method wherein thermal energy is applied to the polymer to produce fine crystals by heat treating the molded part after molding at a temperature that is the glass transition point of the polymer or higher and the melting point of the polymer or lower and the method wherein fine crystals are produced by heat treating the molded part after molding in the presence of a natural mineral are yet other methods of controlling crystal morphology. The above mentioned heat treatment in the presence of a natural mineral can be any method, such as basically heat treating the molded part while it is buried in natural mineral, etc., as long as the energy inherent to the mineral, such as the far infrared rays generate when the mineral is heated, can be applied to the molded part. The temperature when the molded part is heat treated in the presence of the above mentioned natural mineral is preferably the glass transition point of the above mentioned polymer or higher and the melting point of the polymer or lower. Moreover, magnetite, alumina, Bakuhanseki, silica, granite, and andesite, as well as many igneous rock substances, etc., are given as actual examples of the above mentioned natural minerals.

In addition, it is also possible to produce small crystals by applying thermal energy to the polymer by irradiating the molded part after molding with far infrared rays or infrared rays. In this case, the above mentioned molded part after molding can be irradiated with far infrared or infrared rays as it is being heat treated at a temperature that is the glass transition point of the polymer or higher and the melting point of the polymer or lower.

EXAMPLES

The present invention will now be described with actual examples, but these examples do not limit the present invention in any way.

Examples 1 through 5 and Comparative Examples 1 through 4

Pellets for injection molding were obtained from a plastic composite, which was uniformly dispersed after adding the types and amounts of additives shown in Tables 1 and 2 to polyacetal (F10-01; Mitsubishi Kagaku), using a biaxial kneading and extrusion device. Various test pieces were molded from these molding pellets using an injection molding machine (Nissel Jushi Co., Ltd., PS60E Digital Servo Injection Molding Machine) and the properties of the molded part were evaluated by the evaluation methods listed below. The results are shown in Tables 1 and 2.

[Coefficient of Friction and Specific Wear Rate]

The coefficient of friction and specific wear rate were measured using a pin on disk-type friction and wear tester.

Tester: pin on disk-type friction and wear tester (Autopin disk; Starlight Co., Ltd.)

Test conditions: shape of sample sheet=$\phi$5 mm×10 mm, companion surface disk=SUS 303, Ra=0.45 $\mu$m, 0.5 m/sec, no lubricant, ambient temperature =room temperature

[Mechanical Properties]

Tensile yield strength and tensile modulus were measured in accordance with JIS K7113 with the following tester and under the following test conditions:

Tester: autograph (Autograph AGS1000B; Shimadzu Seisakujo)

Test conditions: clock head speed=1 mm/min. ambient temperature=room temperature

[Impact Strength]

Impact strength was measured in accordance with JIS K7110 by the following tester:

Test: Izod impact tester (Tokyo Shoki)

[Spherulite Size]

Spherulite size was observed with an optical polarization microscope.

[Degree of Crystallization]

The degree of crystalllzation was analyzed by X-ray diffraction and the Rurando method

TABLE 1

|  | Example 1 | Example 2 | Example 3 | Example 4 | Example 5 |
| --- | --- | --- | --- | --- | --- |
| Type of resin | polyacetal (F10-01) | | | | |
| Type of additive | SiC | SiC | SiC | Hostamont CaV | Hostamont NaV |
| Amount of additive added (parts by weight) | 0.01 | 0.1 | 1.0 | 0.25 | 0.25 |
| Coefficient of friction | 0.50*1 | 0.51*1 | 0.50*1 | 0.25*1 | 0.20*1 |
| Specific wear rate (mm³/Nm) | $1.5 \times 10^{-5*1}$ | $3.5 \times 10^{-6*1}$ | $7.0 \times 10^{-7*1}$ | $1.2 \times 10^{-6*1}$ | $2.5 \times 10^{-6*1}$ |
| Spherulite size (μm) | 20 | 15 | 10 | 20–25 | 20–25 |
| Degree of crystallization (%) | 50 | 50 | 51 | 53 | 53 |
| Tensile yield strength (Mpa) | 55 | 55 | 55 | — | — |
| Tensile modulus (GPA) | 2.8 | 2.8 | 2.8 | — | — |
| Izod impact unnotched (J/m) | 75 | 80 | 85 | — | — |

SiC = (β type) particle diameter of 0.28 μm, Ipiden Co., Ltd.
Hostamont CaV, NaV: Hoechst
*1Surface pressure = 0.7 MPa

TABLE 2

|  | Comparative Example 1 | Comparative Example 2 | Comparative Example 3 | Comparative Example 4 |
| --- | --- | --- | --- | --- |
| Type of resin | Polyacetal (F10-01) | | | |
| Type of additive | — | SiC | Phenol spheres diameter of φ10 μm or smaller | Carbon black (submicron) |
| Amount of additive added (parts by weight) | — | 10 | 0.1 | 0.1 |
| Coefficient of friction | 0.53*1 | 0.60*1 | 0.55*1 | 0.58*1 |
| Specific wear rate (mm³/Nm) | $1.0 \times 10^{-4*1}$ | $5.0 \times 10^{-7*1}$ | $1.2 \times 10^{-4*1}$ | $1.0 \times 10^{-4*1}$ |
| Spherulite size (μm) | 40 to 60 | 10 | 40 to 60 | 40 to 60 |
| Degree of crystallization (%) | 45 | 51 | 45 | 45 |
| Tensile yield strength (Mpa) | 55 | 55 | 55 | 55 |
| Tensile modulus (GPA) | 2.8 | 2.8 | 2.8 | 2.8 |
| Izod impact unnotched (J/m) | 70 | — | — | — |

SiC = (β type) particle diameter of 0.28 μm, Ipiden Co., Ltd.
*1Surface pressure = 0.7 MPa Examples 6 through 7 and Comparative Example 5

Various types of test pieces were molded as in Examples 1 through 5 and properties of the molded parts were evaluated as previously described using plastic composite that were uniformly dispersed after adding the types and amounts of additives in Table 3 to a plastic composite made from 80 vol % polyacetal (F10-01; Mitsubishi Kagaku) and polytetrafluoroethylene (TF9205; Hoechst). The results are shown in Table 3.

TABLE 3

|  | Example 6 | Example 7 | Comparative Example 5 |
| --- | --- | --- | --- |
| Type of resin | Polyacetal (F10-01) 80% + PTFT 20% | | |
| Type of additive | SiC | SiC | — |
| Amount of additive added (parts by weight) | 0.001 | 1.0 | — |
| Coefficient of friction | 0.25*2 | 0.22*2 | 0.30*2 |
| Specific wear rate (mm³/Nm) | $5.0 \times 10^{-6*2}$ | $7.0 \times 10^{-7*2}$ | $5.0 \times 10^{-5*2}$ |
| Degree of crystallization (%) | 51 | 52 | 46 |

SiC: (β-type) particle diameter of 0.28 μm, Ipiden Co., Ltd.
*2Surface pressure = 0.4 MPa Example 8, Comparative Example 6

Various types of test pieces were molded as in Examples 1 through 5 and properties of the molded parts were evaluated as previously described using a plastic composite that was uniformly dispersed after adding the types and amounts of additives listed in Table 4 to polyphenylene sulfide (Tohpren T4, Tohpren Co., Ltd.).

TABLE 4

|  | Example 8 | Comparative Example 6 |
|---|---|---|
| Type of resin | Polyphenylene sulfide (Tohpren T4) | |
| Type of additive | SiC | — |
| Amount of additive added (parts by weight) | 0.01 | — |
| Coefficient of friction | 0.35[*3] | 0.60[*3] |
| Specific wear rate (mm$^3$/Nm) | $3.0 \times 10^{-5}$[*3] | $3.5 \times 10^{-3}$[*3] |
| Spherulite size ($\mu$m) | Submicron | 2 to 5 |
| Degree of crystallization (%) | 55 | 48 |

SiC: ($\beta$-type) particle diameter of 0.28 $\mu$m, Ipiden Co., Ltd.
[*3]Surface pressure = 0.5 MPa

Example 9 through 11, Comparative Examples 7 through 9

Various types of test pieces were molded as in Examples 1 through 5 and properties of the molded parts were evaluated as previously described using a plastic composite that was uniformly dispersed after adding the types and amounts of additives listed in Table 5 to a plastic composite of 80 volt polyphenylene sulfide (Tohpren T4, Tohpren Co., Ltd.) and 20 volt polytetrafluoroethylene (TF9205; Hoechst).

TABLE 5

|  | Example 9 | Example 10 | Example 11 |
|---|---|---|---|
| Type of resin | 80 vol % polyphenylene sulfide (Topre T4) + 20 vol % PTFE | | |
| Type of additive | SiC | SiC | ZnO |
| Amount of additive added (parts by weight) | 0.001 | 1.0 | 0.3 |
| Coefficient of friction | 0.20[*4] | 0.22[*4] | 0.20[*4] |
| Specific wear rate (mm$^3$/Nm) | $1.0 \times 10^{-6}$[*4] | $3.0 \times 10^{-7}$[*4] | $8.0 \times 10^{-7}$[*4] |
| Degree of crystallization (%) | 54 | 57 | 55 |

|  | Comparative Example 7 | Comparative Example 8 | Comparative Example 9 |
|---|---|---|---|
| Type of resin | 80 vol % polyphenylene sulfide (Tohpren T4) + 20 vol % PTFE | | |
| Type of additive | — | SiC | ZnO |
| Amount of additive added (parts by weight) | — | 10 | 10 |
| Coefficient of friction | 0.22[*4] | 0.38[*4] | 0.30[*4] |
| Specific wear rate (mm$^3$/Nm) | $6.5 \times 10^{-5}$[*4] | $5.5 \times 10^{-7}$[*2] | $5.5 \times 10^{-6}$[*2] |
| Degree of crystallization (%) | 48 | 57 | 57 |

SiC: ($\beta$-type) particle diameter of 0.28 $\mu$m, Ipiden Co.; Ltd.
ZnO: (whisker), Matsushita Sangyo Kiki Co., Ltd.
[*2]Surface pressure = 0.7 MPa
[*4]Surface pressure = 0.3 MPa

Example 12, Comparative Example 10

Various types of test pieces were molded as in Examples 1 through 5 and properties of the molded parts were evaluated as previously described using a plastic composite obtained that was uniformly dispersed after adding the types and amounts of additives listed in Table 6 to polyamide 66 (2020B; Ube Industries, Ltd.).

TABLE 6

|  | Example 12 | Comparative Example 10 |
|---|---|---|
| Type of resin | Polyamide 66 (2020B) | |
| Type of additive | SiC | — |
| Amount of additive added (parts by weight) | 0.1 | — |
| Coefficient of friction | 0.45[*1] | 0.60 |
| Specific wear rate (mm$^3$/Nm) | $2.5 \times 10^{-6}$[*1] | $2.8 \times 10^{-4}$[*1] |
| Spherulite size ($\mu$m) | Submicron | 10 to 20 |
| Degree of crystallization (%) | 35 | 25 |

SiC: ($\beta$-type) particle diameter of 0.28 $\mu$m, Ipiden Co., Ltd.
[*1]Surface pressure = 0.7 MPa

Example 13

Various types of test pieces were molded while applying vibrations with a vibration frequency of 30 Hz and a vibration amplitude of ±1 mm with a vibrating pin, which was set up in the mold, during molding with an injection molding machine (Nissei Jushi Co., Ltd., PS60E Digital Servo Injection Molding Machine) using polyacetal (F10-01; Mitsubishi Kagaku) and the properties of the molded parts were evaluated as previously described. The results are shown in Table 7.

TABLE 7

|  | Example 13 |
|---|---|
| Type of resin | Polyacetal (F10-01) |
| Details of treatment molding | Vibrations applied during |
| Coefficient of friction | 0.40[*1] |
| Specific wear rate (mm$^3$/Nm) | $4.5 \times 10^{-6}$[*1] |
| Spherulite size ($\mu$m) | 1 to 10 |
| Degree of crystallization (%) | 53 |
| Tensile yield strength (Mpa) | 60 |
| Tensile modulus (Gpa) | 3.0 |
| Izod impact strength unnotched (J/M) | 90 |

[*1]Surface pressure = 0.7 MPa

Example 14

Various types of test pieces were molded while applying vibrations with a vibration frequency of 30 Hz and a vibration amplitude of ±1 mm with a vibrating pin, which was set up in the mold, during molding with an injection molding machine (Nissei Jushi Co., Ltd., PS60E Digital Servo Injection Molding Machine) using polyamide (2020B; Ube Industries, Ltd.) and the properties of the molded parts were evaluated as previously described. The results are shown in Table 8.

TABLE 8

|  | Example 14 |
|---|---|
| Type of resin | Polyamide 66 (2020B) |
| Details of treatment | Vibrations applied during molding |
| Coefficient of friction | 0.45[1] |
| Specific wear rate (mm$^3$/Nm) | $7.3 \times 10^{-6}$[*1] |
| Spherulite size ($\mu$m) | Submicron |
| Degree of crystallization (%) | 35 |

[*1]Surface pressure = 0.7 MPa

Example 15

Various types of test pieces were molded with an injection molding machine (Nissei Jushi Co., Ltd., PS60E Digital Servo Injection Molding Machine) using polyphenylene sulfide (Tohpren T4; Tohpren Co., Ltd.) and the molded part after molding was heat treated at 220° C. for 120 minutes while buried in magnetite. The properties of the molded part that was obtained were evaluated as previously described. The results are shown in Table 9.

TABLE 9

|  | Example 15 |
|---|---|
| Type of resin | Polyphenylene sulfide (Tohpren T4) |
| Details of treatment | Heat treatment in magnetite |
| Coefficient of friction | 0.55[*3] |
| Specific wear rate (mm$^3$/Nm) | 5.0 × 10$^{-5}$[*1] |
| Spherulite size (μm) | Submicron |
| Degree of crystallization (%) | 55 |

[*3]Surface pressure = 0.5 MPa

Example 16

Pellets for injection molding were obtained from a plastic composite consisting of 80 vol % polyphenylene sulfide (Tohpren T4; Tohpren Co., Ltd.) and 20 Vol % polytetrafluoroethylene (TF9205; Hoechst) using a biaxial kneading and extrusion device. Various types of test pieces were molded from these pellets for molding using an injection molding machine (Nissei Jushi Co., Ltd., PS60E Digital Servo Injection Molding Machine) and the molded part after molding was heat treated at 220° C. for 120 minutes while buried in magnetite. The properties of the molded part that was obtained were evaluated as previously described. The results are shown in Table 10.

TABLE 10

|  | Example 16 |
|---|---|
| Type of resin | 80 vol % polyphenylene sulfide (Tohpren T4) + 20 vol % PTFE |
| Details of treatment | Heat treatment in magnetite |
| Coefficient of friction | 0.22[*4] |
| Specific wear rate (mm$^3$/Nm) | 2.5 × 10$^{-6}$[*4] |
| Degree of crystallization (%) | 54 |

[*4]Surface pressure = 0.3 MPa

Example 17

Various types of test pieces were molded by an injection molding machine (Nissei Jushi Co., Ltd., PS60E Digital Servo Injection Molding Machine) and the molded parts after molding were heat treated at 220° C. for 120 minutes while buried in Bakuhanseki. The properties of the molded part that was obtained were evaluated as previously described. The results are shown in Table 11.

TABLE 11

|  | Example 17 |
|---|---|
| Type of resin | Polyamide 66 (2020B) |
| Details of treatment | Heat treatment in Bakuhanseki |
| Coefficient of friction | 0.58[*1] |
| Specific wear rate (mm$^3$/Nm) | 7.3 × 10$^{-6}$[*1] |
| Spherulite size (μm) | Submicron |
| Degree of crystallization (%) | 35 |

[*1]Surface pressure = 0.7 MPa

The plastic composite molding materials, molding method, and methods for testing the molded parts that were used in the following Examples and Comparative Examples are shown below:

[Molding Materials]

(1) Resin

POM: polyacetal (Mitsubishi Kagaku, F10-01)

PPS: polyphenylene sulfide (Tohpren, Tohpren T4)

PA66: polyamide 66 (Ube Industries; 2020B)

PC: polycarbonate (Mitsubishi Kagaku; S-2000)

(2) Crystalline Nucleus:

SiC: β-SiC (Ipiden Co., Ltd.))

Hostamont: Montan acid metal salt compound (Hoechst; Hostamont NaV)

(3) Polytetrafluoroethylene (TF9205; Hoechst)

(4) Composites

PC/GF: glass fiber reinforced polycarbonate resin (Mitsubishi Kagaku; GS-2010M)

POM/GF: glass fiber-reinforced polyacetal resin (Mitsubishi Kagaku; MF-3020)

[Molding Methods]

Figure 1:
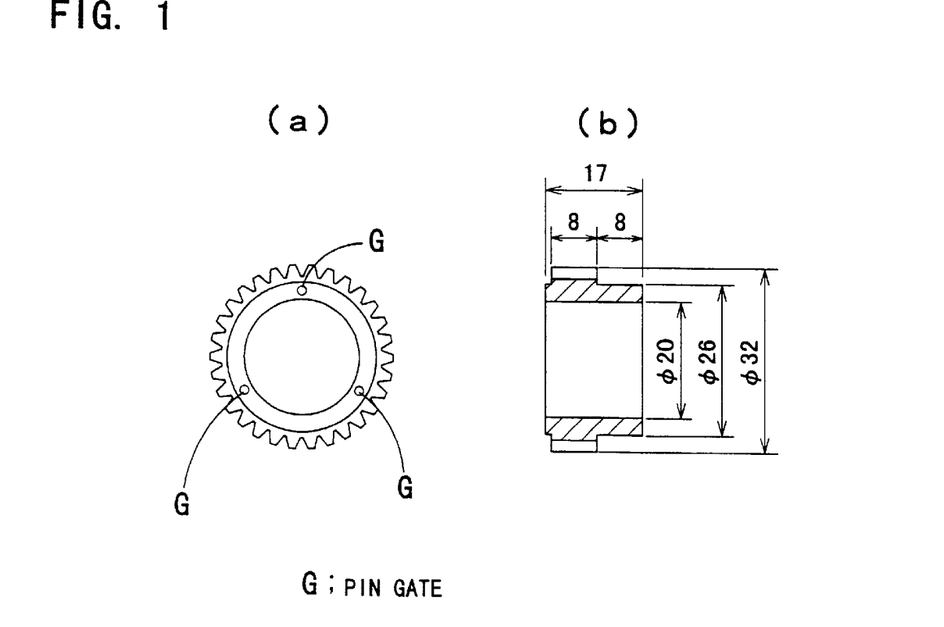
FIG. 1 illustrates the shape of plastic composite gears molded in the Examples and Comparative Examples, with (a) being the front view and (b) being the side view.

(1) Conventional Molding of Test Gears:

Gears were molded in the shapes shown in FIG. 1 under standard molding temperature and standard molding conditions using the PS60E Digital Servo Injection Molding Machine made by Nissei Jushi Co., Ltd.

Gear parameters: module—1, pressure angle =20°, number of teeth=30, tooth width=8.

(2) Conventional Molding of Test Bearings:

Bearings of 20φ×23φ×15 L were molded under standard molding temperature and standard molding conditions using the PS60E Digital Servo Injection Molding Machine made by Nissei Jushi Co., Ltd.

(3) Conventional Molding of Ink Cartridge Holders

Figure 5:
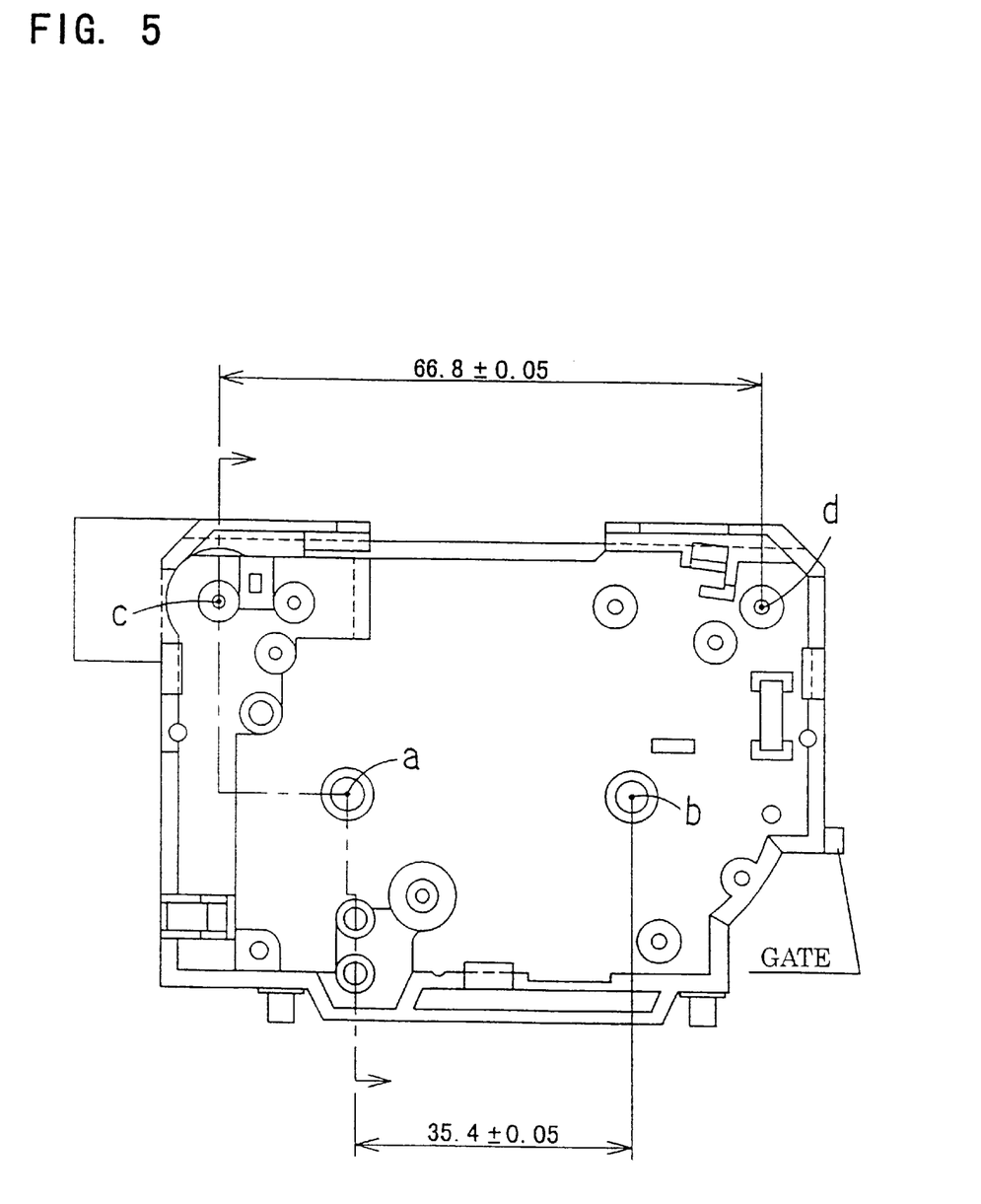
FIG. 5 is a top view of an ink cartridge holder for printers that was molded in the Examples.
Figure 6:
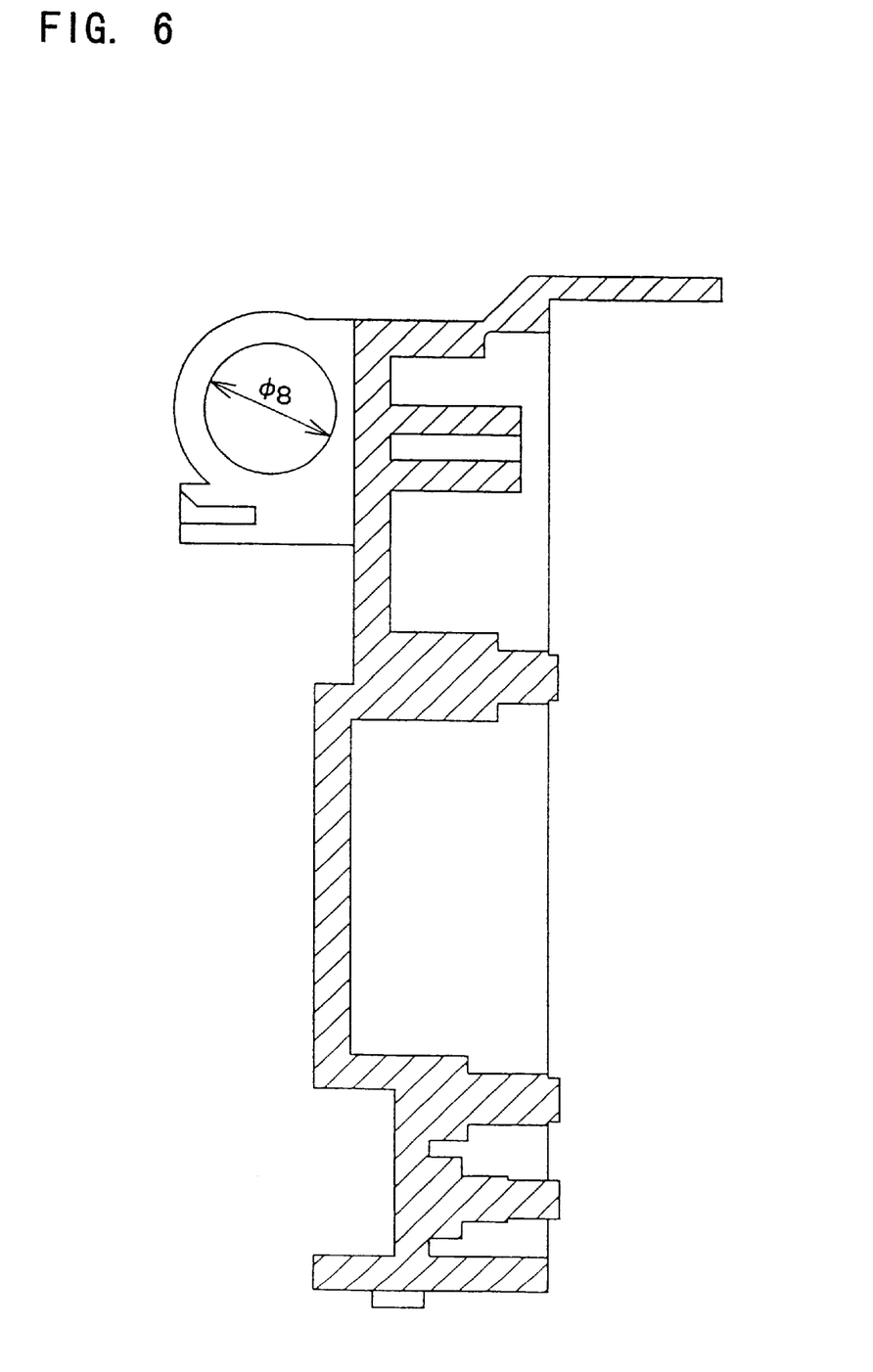
FIG. 6 is an A—A cross section of FIG. 1.

Ink cartridge holders with the shapes shown in FIGS. 5 and 6 were molded under standard molding temperature and standard molding conditions using the PS60E Digital Servo Injection Molding Machine made by Nissei Jushi Co., Ltd.

(4) Vibrational Molding

Gears were molded by applying vibrations with a vibration frequency of 100 Hz and a vibrational amplitude of ±1 mm with a vibrating pin, which was set up inside the mold, during molding in the above mentioned molding of gears, bearings and ink cartridge holders.

[Test Methods]

(1) Spherulite Size

The surface layer and inside of the molded part were cut out at a thickness of 3 μm using a microtome and observed with an optical polarization microscope.

(2) Degree of Crystallization

After X-ray diffraction measurement of the surface layer and the inside of the molded part, the degree of crystallization was analyzed by the Rurando method.

(3) Gear Fatigue Strength and Wear Tests

The total number of revolutions (times) of the gear life and the amount of wear of the gear (mm) at a total number of revolutions of 1 to 106 times were measured under the test conditions shown in the following Table 12 using the dynamic absorption-type gear testing device (Starlight Co., Ltd.) shown in FIG. 2.

TABLE 12

Test conditions

| Type of resin | | |
|---|---|---|
| POM | Gear fatigue test conditions | Combination of the same type of gears, 200 rpm, 2.5 NM, RT |
| | Wear test conditions | Combination of the same type of gears, 200 rpm, 2.0 Nm, RT at $1.0 \times 10^6$ |
| PPS | Gear fatigue test conditions | Combination with S45C gear, 200 rpm, 1.5 NM, RT |
| | Wear test conditions | Combination with S45C gear, 200 rpm, 1.0 Nm, RT at $1.0 \times 10^6$ |
| PA66 | Gear fatigue test conditions | Combination with S45C gear, 200 rpm, 2.5 NM, RT |
| | Wear test conditions | Combination with S45C gear, 2.0 Nm, RT at $1.0 \times 10^6$ |

(4) Mold Shrinkage of Displacement Over a Given Number of Teeth

The crossover gear thickness was measured and mold shrinkage factor was calculated in accordance with JIS B1752.

(5) Mold Shrinkage of Gear Outer Diameter

The mold shrinkage of gear outer diameter was measured by the method described in "Molding Plastic Gear Handbook (Seimitsu Kogakkai, Molding Plastic Gear Research Special Committee, editors).

(5) Gear Accuracy

Gear accuracy was measured in accordance with JIS B 1702.

(6) Temperature near Gear Pitch Point

Figure 2:
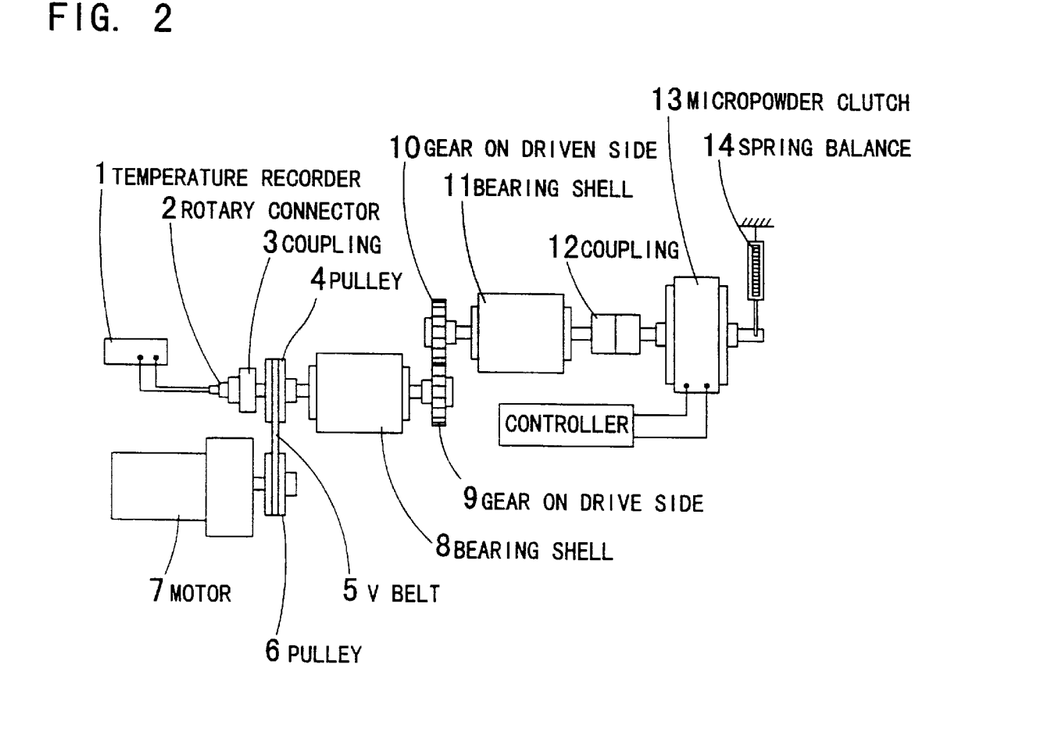
FIG. 2 is a simplified illustration of the dynamic absorption-type gear testing device used to measure the gear fatigue strength and wear of plastic composite gears.
Figure 3:
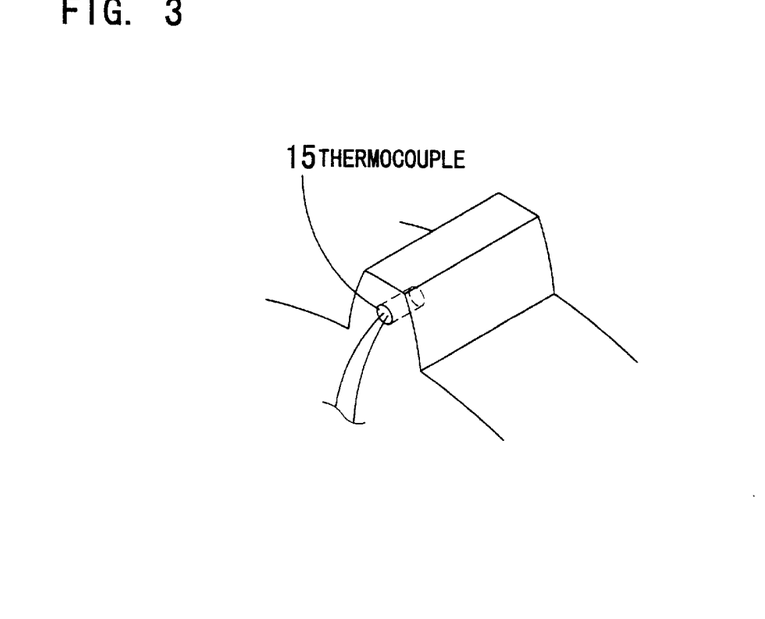
FIG. 3 is an illustration of the main parts of a gear where a thermocouple was set near its pitch point.

Thermocouple (15) was set near the pitch point of a gear, as shown in FIG. 3, and the temperature near the pitch point of gear (9) on the driving side during the test was measured with temperature recorder (1) shown in FIG. 2 during gear fatigue strength and wear tests with the above mentioned dynamic absorption-type gear testing device.

(7) Coefficient of Friction and Wear of Bearing

The coefficient of friction and the wear were measured under the test conditions shown below using a radial journal testing device:

Test conditions: 0.3 MPa, 5 m/min, RT, companion shaft: S45C.

(8) Circularity and Cylindricity of Bearings

Circularity and cylindricity of bearings were measured using the Ronkomu 50A circularity and cylindrical shape measuring device (Tokyo Seimitsu).

(9) Dimensions of Ink Cartridge Holders

The dimensions between a–b and between c–d of the molded parts shown in FIG. 5 and FIG. 6 were measured with a three-dimensional measuring device. The dimensional tolerance between a–b was 35.4±0.05 mm and the dimensional tolerance between c–d was 66.8±0.05 mm.

(10) Circularity of φ8 Area:

Circularity of an opening with of φ8 in the molded part shown in FIGS. 5 and 6 was measured using the Ronkomu 50A Circularity and Cylindrical Shape Measuring Device (Tokyo Seimitsu).

(11) Flexural Modulus

The flexural modulus was measured with the Autograph AGS-100B (Shimadzu Seisakujo).

Examples 18 through 24

Pellets for injection molding were obtained from a plastic composite, which was uniformly dispersed after adding the types and amounts of additives to each resin by the proportions shown in Table 13, using a biaxial kneading and extrusion device. Gears were molded from these pellets for molding and the molded parts were evaluated.

Comparative Examples 11 through 13

Gears were molded from various commercial resin pellets and the molded parts were evaluated.

Figure 4:
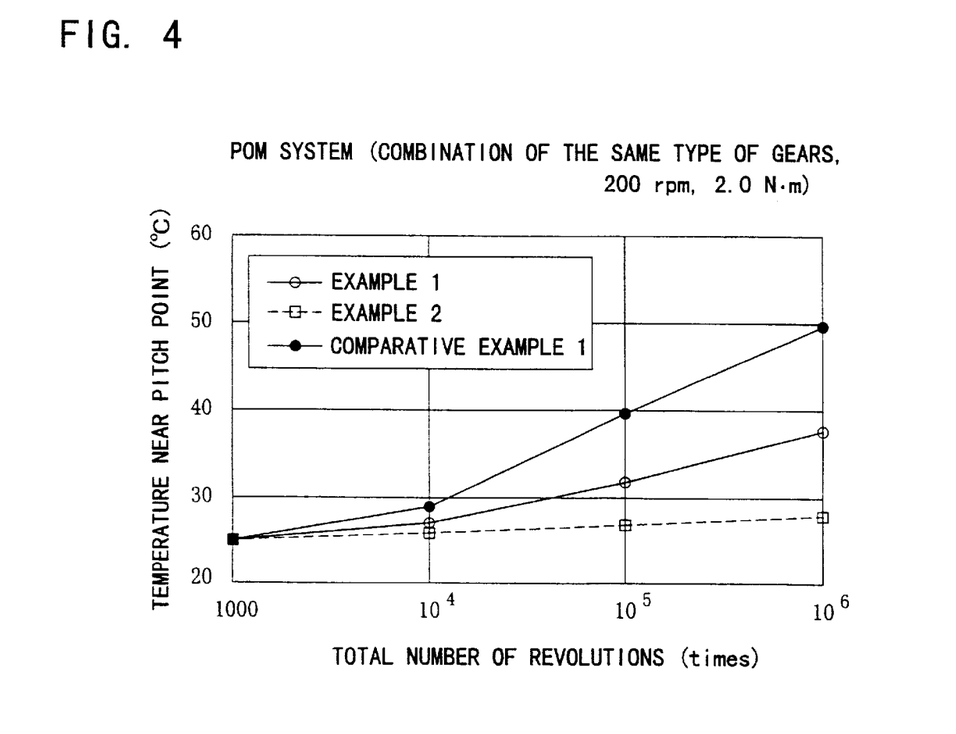
FIG. 4 is a graph illustrating the results of measuring temperature near the pitch point of a gear.

The evaluation results of the molded parts in the above mentioned Examples 18 through 24 and Comparative Examples 11 through 13 are shown in Table 13. Moreover, the temperature near the pitch point of the gears in Examples 18 and 19 and Comparative Example 11 was measured and the results are shown in FIG. 4.

TABLE 13

| | Example 18 | Example 19 | Example 20 | Example 21 |
|---|---|---|---|---|
| Type of resin | POM | POM | PPS | PA66 |
| Type of additive | SiC | Hostamont | SiC | SiC |
| Amount added (wt %) | 0.1 | 1 | 0.01 | 0.1 |
| Molding method | Conventional molding | Conventional molding | Conventional molding | Conventional molding |
| Spherulite size (μm) | | | | |
| Surface layer | 14 | 14 | Submicron | Submicron |
| Inside | 15 | 15 | Submicron | Submicron |
| Degree of crystallization (%) | | | | |
| Surface layer | 50 | 54 | 31 | 35 |
| Inside | 50 | 54 | 31 | 35 |
| Gear fatigue strength (times) | $5.2 \times 10^5$ | $1.3 \times 10^7$ | $4.5 \times 10^5$ | $6.5 \times 10^6$ |
| Gear wear (mm) | 0.16 | 0.08 | 0.13 | 0.10 |
| Mold shrinkage of displacement over a given number of teeth | 19/1,000 | 18/1,000 | 12/1,000 | 17/1,000 |
| Mold shrinkage of gear outer diameter | 19/1,000 | 18/1,000 | 12/1,000 | 17/1,000 |

TABLE 13-continued

| Gear accuracy | Grade 7 | Grade 6 | Grade 6 | Grade 5 |
|---|---|---|---|---|
| | | Example 22 | Example 23 | Example 24 |
| Type of resin | | POM | PA66 | POM |
| Type of additive | | | | SiC |
| Amount added (wt %) | | | | 0.1 |
| Molding method | | Vibrational moiding | Vibrational molding | Vibrational molding |
| Spherulite size (μm) | | | | |
| Surface layer | | 1 to 5 | Submicron | 10 |
| Inside | | 1 to 5 | Submicron | 10 |
| Degree of crystallization (%) | | | | |
| Surface layer | | 53 | 35 | 53 |
| Inside | | 53 | 35 | 53 |
| Gear fatigue strength (times) | | $8.5 \times 10^6$ | $8.0 \times 10^6$ | $1.0 \times 10^7$ |
| Gear wear (mm) | | 0.08 | 0.05 | 0.08 |
| Mold shrinkage of displacement over a given number of teeth | | 18/1,000 | 16/1,000 | 16/1,000 |
| Mold shrinkage of gear outer diameter | | 18/1,000 | 16/1,000 | 16/1,000 |
| Gear accuracy | | Grade 4 | Grade 4 | Grade 4 |
| | | Comparative Example 11 | Comparative Example 12 | Comparative Example 13 |
| Type of resin | | POM | PPS | PA66 |
| Type of additive | | | | |
| Amount added (wt %) | | | | |
| Molding method | | Conventional molding | Conventional molding | Conventional molding |
| Spherulite size (μm) | | | | |
| Surface layer | | 10 to 20 | 1 to 2 | 8 to 12 |
| Inside | | 50 to 60 | 4 to 5 | 15 to 20 |
| Degree of crystallization (%) | | | | |
| Surface layer | | 10 | 10 | 8 |
| Inside | | 46 | 28 | 19 |
| Gear fatigue strength (times) | | $1.0 \times 10^6$ | $7.5 \times 10^5$ | $1.2 \times 10^6$ |
| Gear wear (mm) | | 0.30 | 0.21 | 0.22 |
| Mold shrinkage of displacement over a given number of teeth | | 20/1,000 | 15/1,000 | 20/1,000 |
| Mold shrinkage of gear outer diameter | | 25/1,000 | 20/1,000 | 24/1,000 |
| Gear accuracy | | Gradeless | Gradeless | Gradeless |

As is clear from Table 13, plastic composite gears related to the present invention, wherein either a crystalline nucleus was added to the plastic composite or molding was performed while applying vibrational energy or further, addition of a crystalline nucleus to the plastic composite and application of vibrational energy during molding were concomitantly used, have uniform crystal morphology, including spherulite size and the degree of crystallization, at the surface and inside the molded part, and as a result, gear properties of gear fatigue strength and wear and gear accuracy are improved. Moreover, as is clear from FIG. 4, the temperature near the pitch point is kept from rising by adding the crystalline nucleus.

Examples 25 through 31 and Comparative Examples 14 through 16

Pellets for injection molding were obtained from a plastic composite, which was uniformly dispersed after adding the types and amounts of additives to each resin by the proportions shown in Table 13, using a biaxial kneading and extrusion device. Gears were molded from these pellets for molding by vibrational molding and the molded parts were evaluated. The results are shown in Table 14.

TABLE 14

| | Comparative Example 25 | Comparative Example 26 | Comparative Example 27 |
|---|---|---|---|
| Type of resin | POM | POM | POM |
| Type of additive | PTFE | PTFE | PTFE |
| Amount added (wt %) | 1 | 5 | 10 |
| Molding method | Vibrational molding | Vibrational molding | Vibrational molding |

TABLE 14-continued

|  | | | |
|---|---|---|---|
| Spherulite size (μm) | | | |
| Surface layer | 1 to 5 | 1 to 5 | 1 to 4 |
| Inside | 1 to 5 | 1 to 5 | 1 to 4 |
| Degree of crystallization (%) | | | |
| Surface layer | 53 | 54 | 54 |
| Inside | 53 | 54 | 54 |
| Gear fatigue strength (times) | $9.0 \times 10^6$ | $2.3 \times 10^7$ | $4.5 \times 10^7$ |
| Gear wear (mm) | 0.07 | 0.06 | 0.05 |
| Mold shrinkage of displacement over a given number of teeth | 18/1,000 | 17/1,000 | 17/1,000 |
| Mold shrinkage of gear outer diameter | 18/1,000 | 17/1,000 | 17/1,000 |
| Gear accuracy | Grade 4 | Grade 4 | Grade 3 |

|  | Example 28 | Example 29 | Example 30 |
|---|---|---|---|
| Type of resin | PPS | PA66 | PA66 |
| Type of additive | PTFE | PTFE | PTFE |
| Amount added (wt %) | 5 | 5 | 10 |
| Molding method | Vibrational molding | Vibrational molding | Vibrational molding |
| Spherulite size (μm) | | | |
| Surface layer | Submicron | Submicron | Submicron |
| Inside | Submicron | Submicron | Submicron |
| Degree of crystallization (%) | | | |
| Surface layer | 31 | 35 | 36 |
| Inside | 31 | 35 | 36 |
| Gear fatigue strength (times) | $6.5 \times 10^6$ | $9.5 \times 10^6$ | $3.0 \times 10^7$ |
| Gear wear (mm) | 0.10 | 0.08 | 0.05 |
| Mold shrinkage of displacement over a given number of teeth | 10/1,000 | 16/1,000 | 15/1,000 |
| Mold shrinkage of gear outer diameter | 10/1,000 | 16/1,000 | 15/1,000 |
| Gear accuracy | Grade 5 | Grade 5 | Grade 4 |

|  | Comparative Example 14 | Comparative Example 15 | Comparative Example 16 |
|---|---|---|---|
| Type of resin | POM | PPS | PA66 |
| Type of additive | PTFE | PTFE | PTFE |
| Amount added (wt %) | 20 | 20 | 20 |
| Molding method | Vibrational molding | Vibrational molding | Vibrational molding |
| Spherulite size (μm) | | | |
| Surface layer | 1 to 5 | Submicron | Submicron |
| Inside | 1 to 5 | Submicron | Submicron |
| Degree of crystallization (%) | | | |
| Surface layer | 53 | 31 | 35 |
| Inside | 53 | 31 | 35 |
| Gear fatigue strength (times) | $3.0 \times 10^5$ | $7.0 \times 10^5$ | $8.5 \times 10^5$ |
| Gear wear (mm) | 0.28 | 0.20 | 0.25 |
| Mold shrinkage of displacement over a given number of teeth | 17/1,000 | 10/1,000 | 16/1,000 |
| Mold shrinkage of gear outer diameter | 17/1,000 | 10/1,000 | 16/1,000 |
| Gear accuracy | Grade 4 | Grade 5 | Grade 5 |

As is clear from Table 14, plastic composite gears related to the present invention, which are obtained by adding polytetrafluoroethylene and molding while applying vibrational energy, have crystal morphology, including spherulite size and the degree of crystallization, that is uniform at the surface and inside the molded part, and as a result, gear properties of gear fatigue strength and wear and gear accuracy are improved. Moreover, when too much polytetrafluoroethylene is added, as in Comparative Examples 14 through 16, there is a reduction in the gear properties of gear fatigue strength and wear, even though crystal morphology of spherulite size and the degree of crystallization is uniform at the surface layer and inside the molded part.

Examples 31 through 39

Pellets for injection molding were obtained from a plastic composite, which was uniformly dispersed after adding the types and amounts of additives to each resin by the proportions shown in Table 15, using a biaxial kneading and extrusion device. Gears were molded from these pellets for molding by vibrational molding and the molded parts were evaluated.

Comparative Examples 17 through 19

Bearings were molded from various commercial resin pellets and evaluated.

The results of evaluating above mentioned Examples 31 through 39 and Comparative Examples 17 through 19 are shown in Table 15.

TABLE 15

|  | Example 31 | Example 32 | Example 33 | Example 34 |
|---|---|---|---|---|
| Type of resin | POM | POM | POM | POM |
| Type of additive | SiC | SiC | Hostamont | Hostamont |
| Amount added (wt %) | 0.01 | 0.1 | 0.25 | 0.5 |
| Molding method | Conventional molding | Conventional molding | Conventional molding | Conventional molding |
| Spherulite size (μm) | | | | |
| Surface layer | 20 | 14 | 24 | 19 |
| Inside | 20 | 15 | 24 | 20 |
| Degree of crystallization (%) | | | | |
| Surface layer | 50 | 50 | 53 | 54 |

TABLE 15-continued

|  | | | | |
|---|---|---|---|---|
| Inside | 50 | 50 | 53 | 54 |
| Friction coefficient | 0.50 | 0.51 | 0.25 | 0.20 |
| Wear (mm) | 0.30 | 0.25 | 0.05 | 0.04 |
| Circularity (mm) | 0.10 | 0.07 | 0.06 | 0.03 |
| Cylindricity (mm) | 0.12 | 0.08 | 0.07 | 0.04 |

|  | Example 35 | Example 36 | Example 37 | Example 38 |
|---|---|---|---|---|
| Type of resin | PPS | PA66 | POM | PA66 |
| Type of additive | SiC | SiC |  |  |
| Amount added (wt %) | 0.01 | 0.1 |  |  |
| Molding method | Conventional molding | Conventional molding | Vibrational molding | Vibrational molding |
| Spherulite size (μm) | | | | |
| Surface layer | Submicron | Submicron | 1 to 5 | Submicron |
| Inside | Submicron | Submicron | 1 to 5 | Submicron |
| Degree of crystallization (%) | | | | |
| Surface layer | 31 | 35 | 53 | 35 |
| Inside | 31 | 35 | 53 | 35 |
| Coefficient of friction | 0.35 | 0.45 | 0.50 | 0.45 |
| Wear (mm) | 0.20 | 0.15 | 0.30 | 0.12 |
| Circularity (mm) | 0.08 | 0.07 | 0.02 | 0.02 |
| Cylindricity (mm) | 0.10 | 0.10 | 0.03 | 0.03 |

|  | Example 39 | Comparative Example 17 | Comparative Example 18 | Comparative Example 19 |
|---|---|---|---|---|
| Type of resin | POM | POM | PPS | PA66 |
| Type of additive | SiC |  |  |  |
| Amount added (wt %) | 0.1 |  |  |  |
| Molding method | Vibrational molding | Conventional molding | Conventional molding | Conventional molding |
| Spherulite size (μm) | | | | |
| Surface layer | 10 | 10 to 20 | 1 to 2 | 8 to 12 |
| Inside | 10 | 50 to 60 | 4 to 5 | 15 to 20 |
| Degree of crystallization (%) | | | | |
| Surface layer | 53 | 10 | 15 | 6 |
| Inside | 53 | 46 | 28 | 18 |
| Coefficient of Friction | 0.20 | 0.53 | 0.60 | 0.60 |
| Wear (mm) | 0.15 | 0.80 | 0.85 | 0.75 |
| Circularity | 0.06 | 0.23 | 0.15 | 0.18 |
| Cylindricity | 0.07 | 0.25 | 0.18 | 0.20 |

As is clear from Table 15, plastic composite bearings related to the present invention, wherein either a crystalline nucleus was added to the plastic composite or molding was performed while applying vibrational energy or further, addition of a crystalline nucleus to the plastic composite and application of vibrational energy during molding were concomitantly used, have uniform crystal morphology of spherulite size and the degree of crystallization at the surface and inside the molded part, and as a result, bearing properties of the coefficient of friction and wear properties, and shape accuracy in terms of circularity and cylindricity are improved.

Examples 40 through 52 and Comparative Examples 20 through 22

Pellets for injection molding were obtained from a plastic composite, which was uniformly dispersed after adding polytetrafluoroethylene to various resins by the proportions in Table 16, using a biaxial kneading and extrusion device. Bearings were molded from the pellets for molding by vibrational molding and the molded parts were evaluated. The results are shown in Table 16.

TABLE 16

|  | Example 40 | Example 41 | Example 42 |
|---|---|---|---|
| Type of resin | POM | POM | POM |
| Type of additive | PTFE | PTFE | PTFE |
| Amount added (wt %) | 5 | 15 | 25 |
| Molding method | Vibrational molding | Vibrational molding | Vibrational molding |
| Spherulite size (μm) | | | |
| Surface layer | 1 to 5 | 1 to 4 | 1 to 4 |
| Inside | 1 to 5 | 1 to 4 | 1 to 4 |
| Degree of crystallization (%) | | | |
| Surface layer | 53 | 54 | 54 |
| Inside | 53 | 54 | 54 |
| Coefficient of friction | 0.40 | 0.25 | 0.15 |
| Wear (mm) | 0.20 | 0.15 | 0.18 |
| Circularity | 0.02 | 0.01 | 0.01 |
| Cylindricity | 0.03 | 0.02 | 0.01 |

TABLE 16-continued

|  | Example 43 | Example 44 | Example 45 |
|---|---|---|---|
| Type of resin | PPS | PPS | PA66 |
| Type of additive | PTFE | PTFE | PTFE |
| Amount added (wt %) | 15 | 25 | 25 |
| Molding method | Vibrational molding | Vibrational molding | Vibrational molding |
| Spherulite size ($\mu$m) | | | |
| Surface layer | Submicron | Submicron | Submicron |
| Inside | Submicron | Submicron | Submicron |
| Degree of crystallization (%) | | | |
| Surface layer | 31 | 31 | 35 |
| Inside | 31 | 31 | 35 |
| Coefficient of friction | 0.20 | 0.15 | 0.15 |
| Wear (mm) | 0.10 | 0.13 | 0.15 |
| Circularity | 0.03 | 0.02 | 0.01 |
| Cylindricity | 0.04 | 0.03 | 0.02 |

|  | Comparative Example 20 | Comparative Example 21 | Comparative Example 22 |
|---|---|---|---|
| Type of resin | POM | PPS | PA66 |
| Type of additive | PTFE | PTFE | PTFE |
| Amount added (wt %) | 35 | 35 | 35 |
| Molding method | Vibrational molding | Vibrational molding | Vibrational molding |
| Spherulite size ($\mu$m) | | | |
| Surface layer | 1 to 4 | Submicron | Submicron |
| Inside | 1 to 4 | Submicron | Submicron |
| Degree of crystallization (%) | | | |
| Surface layer | 54 | 31 | 35 |
| Inside | 54 | 31 | 35 |
| Coefficient of friction | 0.12 | 0.13 | 0.11 |
| Wear (mm) | 0.48 | 0.63 | 0.55 |
| Circularity (mm) | 0.02 | 0.02 | 0.01 |
| Cylindricity | 0.02 | 0.02 | 0.02 |

As is clear from Table 16, by adding polytetrafluoroethylene and molding while applying vibrational energy, crystal morphology of spherulite size and the degree of crystallization is uniform at the surface and inside the molded part, and as a result, bearing properties of the coefficient of friction and wear, and shape accuracy, or cylindricity and circularity, are improved. Moreover, when too much polytetrafluoroethylene is added, as in Comparative Examples 20 through 22, there is a reduction in the wear properties, even though crystal morphology of spherulite size and the degree of crystallization, is uniform at the surface layer and inside the molded part, and the coefficient of friction and shape accuracy are improved.

Examples 46 through 57

Pellets for injection molding were obtained from a plastic composite, which was uniformly dispersed after adding the each of the types and amounts of additives to each type of resin by the proportions shown in Table 17 and Table 18, using a biaxial kneading and extrusion device. Printer ink cartridge holders with the shape shown in FIG. 5 and FIG. 6 were molded from these pellets for molding and evaluated. Furthermore, flexural modulus was evaluated using a test piece (13 mm×8 mm×120 mm) molded with a bending test piece mold.

Comparative Examples 23 through 26

Printer ink cartridge holders with the shape in FIG. 5 and FIG. 6 were molded from each type of commercial resin pellet and evaluated. The flexural modulus was evaluated using a test piece (13 mm×8 mm×120 mm) that had been molded from a bending test piece.

The results of evaluating above mentioned Examples 46 through 57 and Comparative Examples 23 to 26 are shown in Table 17 and Table 18.

TABLE 17

|  | Example 46 | Example 47 | Example 48 | Example 49 |
|---|---|---|---|---|
| Type of resin | POM | POM | POM | POM |
| Type of additive | SiC | SiC | SiC | SiC |
| Amount added (wt %) | 0.1 | 1 | 5 | 10 |
| Molding method | Conventional molding | Conventional molding | Conventional molding | Conventional molding |
| Spherulite size ($\mu$m) | | | | |
| Surface layer | 14 | 10 | 9 | 9 |
| Inside | 15 | 10 | 9 | 9 |
| Degree of crystallization (%) | | | | |
| Surface layer | 50 | 51 | 51 | 51 |
| Inside | 50 | 51 | 51 | 51 |
| a-b Dimension (mm) | 35.41 | 35.42 | 35.44 | 35.44 |
| c-d Dimension (mm) | 66.76 | 66.77 | 66.78 | 66.78 |
| Circularity of $\phi$8 area | 0.05 | 0.04 | 0.03 | 0.03 |
| Flexural modulus (GPa) | 2.6 | 2.6 | 2.6 | 2.6 |
|  | Example 50 | Example 51 | Example 52 | Example 53 |
| Type of resin | POM | POM | POM | POM |
| Type of additive | Hostamont | Hostamont | Hostanont | SiC |
| Amount added (wt %) | 0.5 | 5 | 10 | 0.1 |

TABLE 17-continued

| Molding method | Conventional molding | Conventional molding | Conventional molding | Vibrational molding |
|---|---|---|---|---|
| Frequency | | | | 10 |
| Spherulite size (μm) | | | | |
| Surface layer | 19 | 17 | 16 | 1 to 8 |
| Inside | 20 | 17 | 16 | 1 to 8 |
| Degree of crystallization (%) | | | | |
| Surface layer | 54 | 55 | 55 | 53 |
| Inside | 54 | 55 | 55 | 53 |
| a-b Dimension (mm) | 35.44 | 35.44 | 35.44 | 35.42 |
| c-d Dimension (mm) | 66.83 | 66.84 | 66.84 | 66.77 |
| Circularity of φ8 area | 0.03 | 0.02 | 0.02 | 0.04 |
| Flexural modulus (GPa) | 2.6 | 2.6 | 2.6 | 2.7 |

TABLE 18

| | Example 54 | Example 55 | Example 56 | Example 57 |
|---|---|---|---|---|
| Type of resin | POM | POM | POM | POM |
| Type of additive | | | | |
| Amount added (wt %) | | | | |
| Molding method | Vibrational molding | Vibrational molding | Vibrational molding | Vibrational molding |
| Frequency (Hz) | 10 | 100 | 1,000 | 5,000 |
| Spherulite size (μm) | | | | |
| Surface layer | 3 to 8 | 1 to 7 | 1 to 5 | 1 to 5 |
| Inside | 3 to 8 | 1 to 7 | 1 to 5 | 1 to 5 |
| Degree of crystallization (%) | | | | |
| Surface layer | 52 | 53 | 54 | 53 |
| Inside | 52 | 53 | 54 | 53 |
| a-b Dimension (mm) | 35.43 | 35.44 | 35.44 | 35.44 |
| c-d Dimension (mm) | 66.83 | 66.83 | 66.84 | 66.84 |
| Circularity of φ8 area | 0.02 | 0.01 | 0.01 | 0.01 |
| Flexural modulus (GPa) | 2.6 | 2.8 | 2.8 | 2.8 |

| | Comparative Example 23 | Comparative Example 24 | Comparative Example 25 | Comparative Example 26 |
|---|---|---|---|---|
| Type of resin | POM/ | PC | PC/ | POM |
| Type of additive | GF | | GF | |
| Amount added (wt %) | 20 | | 10 | |
| Molding method | Conventional molding | Conventional molding | Conventional molding | Vibrational molding |
| Frequency (Hz) | | | | 1.000 |
| Spherulite size (μm) | | | | |
| Surface layer | 12 to 20 | — | — | 5 to 12 |
| Inside | 53 to 60 | — | — | 8 to 15 |
| Degree of crystallization (%) | | | | |
| Surface layer | 12 | — | — | 48 |
| Inside | 46 | — | — | 51 |
| a-b Dimension (mm) | 35.73 | 35.66 | 35.73 | 35.41 |
| c-d Dimension (mm) | 67.17 | 67.17 | 67.17 | 66.84 |
| Circularity of φ8 area | 0.22 | 0.04 | 0.23 | 0.06 |
| Flexural modulus (GPa) | 3.5 | 2.3 | 3.4 | 2.5 |

As is clear from Tables 17 and 18, the plastic composite molded parts related to the present invention, wherein crystalline nucleus is added, vibrational energy is applied, or a crystalline nucleus is added and molding is performed while applying vibrational energy, has uniform spherulite size and degree of crystallization at the surface layer and the inside of the molded part and therefore, dimensional accuracy is improved to within the dimensional tolerance. In contrast to this, by means of Comparative Example 23, which was molded as usual after adding glass fibers without adding a crystalline nucleus, there are fluctuations in the spherulite size and degree of crystallization at the surface and inside the molded part, and dimensional accuracy of the molded part is poor and outside the dimensional tolerance. Moreover, amorphous polymers with a low mold shrinkage factor are generally used in the case of products with strict dimensional accuracy. However, flexural modulus is low in Comparative Example 24, which was molded using the amorphous polymer polycarbonate. In short, a disadvantage of amorphous polymers is that they have a lower flexural modulus than crystalline polymers. Consequently, there is a chance that part of the product will deform under outside pressure with products that are thin and are made from amorphous polymers with a low flexural modulus and it is necessary to improve the flexural modulus. However, Comparative Example 25 was molded after adding glass fibers to polycarbonate, which should increase flexural modulus, but dimensional accuracy of the molded product was poor and shape control was very difficult.

As previously described, by means of the present invention, plastic composite gears with excellent gear properties, such as friction and wear properties, gear fatigue strength, etc., and gear accuracy, plastic composite bearings with excellent bearing properties, such as friction and wear properties, etc., and shape accuracy, as well as other plastic composite molded parts with excellent mechanical strength and dimensional accuracy, can be produced at a low cost, and plastic composite molded parts with excellent recycling performance can be presented, without adding large quantities of various solid lubricants and glass fibers, etc., as in the past by controlling crystal morphology of a crystalline polymer.

What is claimed is:

1. A method for producing plastic composite molded parts wherein parts are molded by injection molding or transfer molding of crystalline polymer, and crystal morphology of said crystalline polymer is controlled during molding or after molding so that crystal morphology of the polymer in the molded parts is almost uniform throughout the entire molded part.

2. The method according to claim 1, wherein spherulite size of the polymer in the molded part is almost uniform throughout the entire molded part.

3. The method according to claim 1, wherein the degree of crystallization of the polymer in the molded part is almost uniform throughout the entire molded part.

4. The method according to claim 1, wherein the spherulite size of the polymer in the molded part is small in comparison to before molding.

5. The method according to claim 1, wherein the degree of crystallization of the polymer in the molded part is high in comparison to before molding.

6. The method according to claim 1, wherein the coefficient of friction of and the specific wear rate of the molded part are reduced by uniforming crystal morphology of the polymer in the molded parts almost throughout the entire molded part.

7. The method according to claim 1, wherein the dimensional accuracy and shape accuracy of the molded part are improved by uniforming crystal morphology of the polymer in the molded parts almost throughout the entire molded part.

8. The method according to claim 1, wherein the crystal morphology of the polymer in the molded part is controlled by adding a crystalline nucleus of 0.01 to 10 weight % to the crystalline polymer and molding.

9. The method according to claim 1, wherein the crystal morphology of the polymer in the molded part is controlled by molding while applying vibrations having a number of vibrations of 10 to 5,000 Hz and a size of vibrations ±0.01 mm to ±1 mm.

10. The method according to claim 1, wherein the crystal morphology of the polymer in the molded part is controlled by adding a crystalline nucleus of 0.01 to 10 weight % to the crystalline polymer and molding while applying vibrations having a number of vibrations of 10 to 5,000 HZ and a size of vibrations of ±0.01 mm to ±1 mm.

11. The method according to claim 1, wherein the crystal morphology of the polymer in the molded part is controlled by heat treating the molded part after molding at a temperature that is the glass transition point of the crystalline polymer or higher and the melting point or lower.

12. The method according to claim 1, wherein the crystal morphology of the polymer in the molded part is controlled by heat treatment of the molded part after molding in the presence of a natural mineral.

13. The method according to claim 1, wherein the crystal morphology of the polymer in the molded part is controlled by irradiating the molded part after molding with far infrared rays or infrared rays.

14. The method according to claim 1, wherein the crystalline polymer is polyacetal.

15. The method according to claim 14, wherein the spherulite size of the polymer in the molded part is 20 $\mu$m or less, and the degree of crystallization is 20% or higher.

16. The method according to claim 15, wherein the molded part is a bearing.

17. The method according to claim 14, wherein the spherulite size in the molded part is 15 $\mu$m or smaller and the degree of crystallization is 50% or higher.

18. The method according to claim 17, wherein the molded part is a gear.

19. The method according to claim 1, wherein the crystalline polymer is polyamide.

20. The method according to claim 19, wherein the spherulite size of the polymer in the molded part is submicron and the degree of crystallization is 20% or more.

21. The method according to claim 20, wherein the molded part is a gear.

22. The method according to claim 20, wherein the molded part is a bearing.

23. The method according to claim 1, wherein the crystalline polymer is polyphenylene sulfide.

24. The method in claim 23, wherein the spherulite size of the polymer in the molded part is submicron and the degree of crystallization is 30% or higher.

25. The method according to claim 24, wherein the degree of crystallization in the molded part is 50% or higher.

26. The method according to claim 24, wherein the molded part is a gear.

27. The method according to claim 26, wherein the molded part is a bearing.

* * * * *